(12) United States Patent
Schlesiger

(10) Patent No.: US 11,297,845 B2
(45) Date of Patent: Apr. 12, 2022

(54) ARRANGEMENT AND METHOD FOR CONVEYING POULTRY

(71) Applicant: FPI FOOD PROCESSING INNOVATION GMBH + CO. KG, Lübeck (DE)

(72) Inventor: Oliver Schlesiger, Lübeck (DE)

(73) Assignee: FPI Food Processing Innovation GmbH + Co. KG, Lübeck (DE)

( * ) Notice: Subject to any disclaimer, the term of this patent is extended or adjusted under 35 U.S.C. 154(b) by 0 days.

(21) Appl. No.: 17/272,418

(22) PCT Filed: Sep. 3, 2018

(86) PCT No.: PCT/EP2018/073631
§ 371 (c)(1),
(2) Date: Mar. 1, 2021

(87) PCT Pub. No.: WO2020/048582
PCT Pub. Date: Mar. 12, 2020

(65) Prior Publication Data
US 2021/0307343 A1    Oct. 7, 2021

(51) Int. Cl.
*A22C 21/00*    (2006.01)
(52) U.S. Cl.
CPC ...... *A22C 21/0053* (2013.01); *A22C 21/0007* (2013.01)
(58) Field of Classification Search
CPC .. A22C 21/00; A22C 21/0053; A22C 21/0007
(Continued)

(56) References Cited

U.S. PATENT DOCUMENTS 5,453,045 A    9/1995    Hobbel et al.
6,093,093 A    7/2000    Mostoller et al.
(Continued)

FOREIGN PATENT DOCUMENTS

CN    1237921 A    12/1999
CN    104273202 A    1/2015
(Continued)

OTHER PUBLICATIONS

International Search Report dated Oct. 29, 2019; International Application No. PCT/EP2018/073631.

*Primary Examiner* — Richard T Price, Jr.
(74) *Attorney, Agent, or Firm* — Dinsmore & Shohl LLP

(57) ABSTRACT

An arrangement, apparatus and method for conveying poultry is provided. The arrangement transfers slaughtered poultry between conveying lines and has at least one rotary device for conveying suspended poultry along a curved conveying path with suspension mounts, each designed to hold a poultry body by both legs. A linear motor conveying device with a guide rail, which comprises a linear drive, forms a circulating conveying path and has runners, each arranged to be separately controllable and movable along the guide rail by the linear drive. A holding element is designed to accommodate one poultry leg at a time, with one of the holding elements arranged on each runner. The rotary device and the linear motor conveying device are arranged such that, in a transfer region, the curved conveying path at least partially overlaps with a curved portion of the circulating conveying path in order to transfer the poultry.

30 Claims, 11 Drawing Sheets

(58) Field of Classification Search
USPC .......................................... 452/177, 180–183
See application file for complete search history.

(56) References Cited

U.S. PATENT DOCUMENTS

| | | | |
|---|---|---|---|
| 6,152,816 A | 11/2000 | van den Nieuwelaar et al. | |
| 8,708,785 B2* | 4/2014 | Aandewiel | A22C 21/0053 |
| | | | 452/182 |
| 10,130,107 B2* | 11/2018 | Winkelmolen | A22C 21/06 |
| 10,357,042 B1* | 7/2019 | Sosebee | A22C 21/0007 |
| 2008/0125025 A1 | 5/2008 | Van Den Nieuwelaar et al. | |
| 2015/0017896 A1 | 1/2015 | Aandewiel et al. | |
| 2015/0060153 A1 | 3/2015 | Peters et al. | |
| 2015/0366227 A1 | 12/2015 | van den Berg et al. | |
| 2016/0021902 A1* | 1/2016 | Winkelmolen | A22C 21/06 |
| | | | 452/106 |
| 2016/0278395 A1 | 9/2016 | Van Steijn et al. | |
| 2017/0020145 A1* | 1/2017 | Peters | A22C 21/0053 |
| 2017/0127690 A1* | 5/2017 | Inoue | A22C 21/0069 |
| 2019/0387757 A1* | 12/2019 | Hazenbroek | A22C 21/0069 |

FOREIGN PATENT DOCUMENTS

| | | |
|---|---|---|
| CN | 105994571 A | 10/2016 |
| CN | 106090155 A | 11/2016 |
| DE | 3048342 A1 | 7/1982 |
| DK | 165475 B | 12/1992 |
| EP | 0273371 A2 | 7/1988 |
| EP | 0736255 A1 | 10/1996 |
| EP | 2687101 B1 | 6/2015 |
| JP | 2001510024 A | 7/2001 |
| KR | 970004114 | 2/1996 |
| KR | 970000111 U | 1/1997 |
| KR | 20130033058 A | 4/2013 |
| KR | 20180038299 A | 4/2018 |
| SU | 530672 A1 | 10/1976 |
| WO | 2016003271 A1 | 1/2016 |

* cited by examiner

ARRANGEMENT AND METHOD FOR CONVEYING POULTRY

CROSS-REFERENCE TO RELATED APPLICATIONS

This application is the U.S. national stage of PCT/EP2018/073631 filed Sep. 3, 2018, which is hereby incorporated by reference in its entirety.

FIELD OF THE INVENTION

The present invention relates to an arrangement and a method for transferring slaughtered poultry between conveying lines in a poultry processing plant.

The invention further relates to an apparatus and a method for conveying slaughtered poultry in a suspended state along a conveying path in a poultry processing plant.

BACKGROUND OF THE INVENTION

Such arrangements, apparatuses and methods are used in plants for conveying slaughtered poultry or processing slaughtered poultry. Such plants usually comprise a plurality of different conveying and processing lines at the respective interfaces of which it is necessary to transfer the slaughtered poultry bodies from the one line to another line.

Document EP 2 687 101 B1 discloses a processing device for poultry with a transfer unit for transferring slaughtered poultry bodies from one conveying line to another conveying line. Each transfer unit comprises a circulating carrier with a plurality of transfer means. By switching between a blocked and a block-free state, the carriers run either synchronously with the circulating carrier or are decoupled from this circulating movement.

One disadvantage of the known apparatus is that the conveying speed of the transfer means can only be varied between two speeds, namely such that it is either zero or corresponds to the speed of the circulating carrier. The known transfer unit therefore only has a very limited area of use. In particular, if the conveying speed of one of the conveying lines fluctuates, it is not possible to adjust the conveying speed of the transfer means accordingly. Among other things, this can result in transfer errors when transferring the slaughtered poultry bodies from one conveying line to the other.

The transfer means disclosed in document EP 2 687 101 B1 are configured in each case to accommodate a slaughtered poultry body. For this purpose, the transfer means have appropriate receptacles into which both legs of each slaughtered poultry body are hooked. The slaughtered poultry bodies are transferred according to the teaching of EP 2 687 101 B1 by simultaneously transferring both legs from the one discharging conveying line to the other receiving conveying line. Due to this transfer principle, correspondingly wide radii of the circulating carrier are absolutely necessary to achieve a reliable transfer. As a result, the freedom of choice regarding the geometry of the conveying lines is subject to tight limits.

SUMMARY OF THE INVENTION

It is therefore the object of the present invention to propose an arrangement that ensures a highly reliable transfer of slaughtered poultry between conveying lines, the conveying lines having the greatest possible variability with regard to their geometry and conveying speed. The object is also to propose a corresponding method.

In addition, it is the object of the present invention to propose an apparatus by which slaughtered poultry bodies can be conveyed as variably as possible with a high degree of reliability. It is also the object of the present invention to propose a method corresponding thereto.

The object is achieved by an arrangement having the features referred to hereinbefore, the arrangement comprising at least one rotary device for conveying slaughtered poultry in a suspended state along a curved conveying path with a plurality of suspension mounts, each designed to hold a poultry body by both legs, a linear motor conveying device with a guide rail which comprises a linear drive, forms a circulating conveying path and has a plurality of runners, arranged in each case to be separately controllable and movable along the guide rail by the linear drive, and also holding elements, configured to accommodate one poultry leg at a time, in each case one of the holding elements being arranged on each of the runners, the rotary device and the linear motor conveyor being arranged such that, in a transfer region, the curved conveying path at least partially overlaps with a curved portion of the circulating conveying path in order for the slaughtered poultry to be transferred between the conveying lines.

The arrangement according to the invention immediately offers a whole series of advantages. The linear motor conveying device offers a maximum degree of variability regarding choice of the conveying speeds and positioning options. The conveying speeds or conveying speed profiles are predefinable for each of the runners. In this way, the conveying speed of each runner can be individually adjusted to the respective circumstances. In particular, it is possible to stop the slaughtered poultry bodies in order to carry out handling and/or processing steps thereon.

Due to the single-leg conveying by a runner configured in each case to be separately controllable and movable, a single-leg transfer takes place when transferring the slaughtered poultry bodies between the conveying lines. In this way, it is possible to implement curved portions in the transfer region which have significantly reduced curve radii compared to those known from prior art. A further advantage is, due to the flexible choice of speed of the runners, the respective speeds of the runners can be optimally adjusted to any fluctuations occurring in the conveying speed of the rotary device, thus ensuring exact and highly reliable transfer at all times.

An expedient embodiment of the invention is characterised in that the linear motor conveying device comprises a control device which is designed to convey one poultry body at a time in a variably controllable manner by moving a pair of runners in pairs, the runner pair comprising two of the adjacent runners in each case. In other words, two each of the separately controllable runners which are adjacent on the conveying rail form a runner pair which is configured to convey one of the slaughtered poultry bodies at a time. The adjacent runners in each case are thus coupled together on the control side. Both of said runners thus move interdependently.

More preferably, it is provided to set the distance between each two adjacent runners in a variably controllable manner. It is possible by varying the distance between the runners of such a runner pair to change the vertical alignment of the slaughtered poultry body to a certain extent. If the distance is increased, this results in raising of the poultry body, if it is decreased this results in lowering. In this way it is possible to position and align the slaughtered poultry body optimally, for a subsequent processing operation for example. In addition, it is possible to pretension the slaughtered poultry body to a greater or lesser extent for certain processing steps in order to achieve improved processing results.

According to an advantageous development, it is provided that the runners each comprise position tracking means to determine the runner position in each case. This has the advantage that the current positions of each of the runners are detected and thus, on the one hand, exact positioning of each individual runner is guaranteed at all times by the linear motor conveying device and, on the other hand, the current positions and speeds of each individual slaughtered poultry body are detected via the respective runner positions.

An advantageous embodiment of the invention is characterised in that the control device is configured to control the linear drive in such a manner that the distance in each case between the holding elements 20 of the runners 19 of one of the runner pairs corresponds at least substantially to a predetermined runner pair spacing.

Thus, the runner pair spacing is understood to be the distance between the holding elements 20 of the two adjacent runners 19, thus corresponding at the same time to the distance between the poultry legs 12 suspended in the respective holding elements 20.

Advantageously, for example, one of the runners forming the runner pair is designed as the master whose current speed and position is specified by the control device as required. The respective other runner of this runner pair is configured as the slave and follows the first mentioned runner, triggered by the control device, in such a manner that the distance between the respective holding elements 20 of the runners 19 is constant or substantially constant.

Advantageously, the control device is therefore configured to control the position and/or the speed of at least one of the runners of one of the runner pairs in each case based on a target position value and/or a target speed value. More preferably, the control device is configured to track the position and/or the speed of the respective other runner of one of the runner pairs in each case while maintaining the respective runner pair spacing.

According to a further preferred embodiment of the invention, the rotary device comprises a drive unit and is driven at least substantially at constant circulation speed. Advantageously, the rotary device comprises sensor means which are configured to detect the angular position of the rotary device, to detect the actual circulation speed and to determine the respective current position of at least one of the suspension mounts. The rotary device is further designed to transmit the variables thus detected to the control device. In this way, for example, it is possible to detect load-dependent fluctuations of the circulation speed of the rotary device and determine its current angular position at any time which serves as the starting basis for synchronising transfer of the slaughtered poultry bodies from the rotary device to the linear motor conveying device.

According to a further preferred embodiment, the control device is designed to control the position and/or the speed of the runners of a runner pair based on the detected actual circulation speed and the determined current position of the at least one suspension mount in such a manner that in each case one of the runners and the respective suspension mount of the rotary device come together simultaneously in the transfer region for single leg transfer. In other words, the control device is designed to synchronise a coordinated meeting of one of the runners with the leg to be transferred from the rotary device. The control device, for example, is configured to predict from the said output values what speed or what speed profile of the runner is required in order to come together precisely with the leg of the slaughtered poultry body in the transfer region.

According to a further preferred embodiment of the invention, the rotary device is configured to transfer the poultry bodies to the linear motor conveying device and the arrangement further comprises a second rotary device which is designed to transfer the poultry bodies from the linear motor conveying device to the second rotary device. This has the advantage that the slaughtered poultry bodies are transferred from the rotary device to the linear motor conveying device in a variably controllable manner. The slaughtered poultry bodies conveyed by the linear motor conveying device are now decoupled from the timing of the rotary device and can be stopped, for example for the purpose of carrying out stationary processing. They are then conveyed further by the linear motor conveying device and transferred to the second rotary device. Both of the rotary devices are preferably designed in such a manner that they work synchronously with a main conveying line. While the rotary device is configured to first remove the slaughtered poultry bodies from the main conveying line and transfer them to the linear motor conveying device, the second rotary device is designed to subsequently take the poultry bodies from the linear motor conveying device and finally return them to the main conveying line.

The object is further achieved by an apparatus having the features referred to hereinbefore in that the apparatus comprises at least one linear motor conveying device with a circumferential guide rail comprising a linear drive and with a plurality of runners arranged in each case to be separately controllable and movable along the guide rail by the linear drive. The apparatus further comprises holding elements designed to accommodate one poultry leg at a time, one of the holding elements respectively being arranged on each of the runners, a control device designed to control the linear drive, the control device being configured to convey one of the poultry bodies at a time in a variably controllable manner by moving a pair of runners in pairs. The runner pair comprises two adjacent runners in each case. Two each of the separately controllable runners, which are adjacent on the conveying rail, advantageously form a runner pair which is configured to convey one of the slaughtered poultry bodies at a time. The adjacent runners in each case are thus coupled together on the control side. Both of said runners thus move interdependently. This coupling of two of the runners at a time ensures that the slaughtered poultry bodies are conveyed reliably. Both legs of the slaughtered poultry body are securely held by one runner each with one of the holding elements. The enforced-coupled movement of the two runners forms a kind of rigid double suspension mount for the slaughtered poultry body to be conveyed. However, the spacing of the holding elements of such a double suspension mount is configured to be variably controllable, such that the spacing can be varied to a certain extent for different purposes.

A preferred development of the invention is characterised in that the runners each comprise position tracking means to determine the respective runner position. By varying the spacing of the runners of such a runner pair, conveying becomes possible even through tight radii or more complex guide rail geometries. In addition, vertical alignment of the slaughtered poultry body is possible to a certain extent. If the distance is increased, this results in raising of the poultry body, if the distance is decreased the result is lowering. In this way, it is possible to position and align the slaughtered poultry body optimally, for a subsequent processing operation for example. In addition, it is possible to pretension the slaughtered poultry body to a greater or lesser extent for certain processing steps in order to achieve improved processing results. More preferably, the control device is configured to control the linear drive in such a manner that the distance in each case between the runners of one of the runner pairs corresponds at least substantially to a predetermined runner pair spacing.

A further expedient embodiment of the invention is characterised in that the control device is configured to control the position and/or the speed of at least one of the runners of one of the runner pairs in each case based on a target position value and/or a target speed value. This has the advantage that the current positions of each runner with the holding element are detected and thus, on the one hand, exact positioning of each individual runner is guaranteed at all times by the linear motor conveying device and, on the other hand, the current positions and speeds of each individual slaughtered poultry body are detected via the respective runner positions.

According to a further preferred embodiment, the control device is further configured to track the position and/or the speed of the respective other runner of one of the runner pairs in each case while maintaining the respective runner pair spacing. Advantageously, the position and/or speed of one of the runners is thus predefinable by the control device, while the respective other of the runners of one of the runner pairs is controllably oriented to the movement pattern of the first runner. In other words, the control device is designed to control one of the runners of one of the runner pairs as the master whose current speed and position is specified by the control device as required. The respective other runner of this runner pair is configured as the slave and follows the first runner, triggered by the control device, at a constant or substantially constant distance. In this way, the distance between the holding elements 20 of the runners 19 is kept constant or substantially constant.

Furthermore, the object is achieved by a corresponding method having the features referred to hereinbefore, in that the method comprises the steps of conveying slaughtered poultry by at least one rotary device designed for conveying the slaughtered poultry in a suspended state along a curved conveying path, the poultry bodies being held in each case by both legs by a plurality of suspension mounts of the rotary device; conveying the slaughtered poultry by a linear motor conveying device, comprising a linear drive, along a circulating conveying path formed by a guide rail by controlled movement of a plurality of runners arranged along the guide rail, each runner being separately controllable and movable by the linear drive, one poultry leg in each case being held by holding elements, one each of which is arranged on each of the runners; transferring the slaughtered poultry between the conveying lines by at least partial overlapping, in the transfer region, of the curved conveying path of the rotary device with a curved portion of the circulating conveying path. The combination of conveying by the linear motor conveying device and separate controllable single-leg conveying offers a high degree of flexibility and variability when conveying. Single-leg conveying enables travel along any conveying path geometries, in particular passing through tight radii. In addition, various conveying speeds and/or conveying speed profiles, including stopping the slaughtered poultry bodies for processing purposes, are possible. A further advantage is that the poultry bodies can be raised or lowered to a certain extent in that the distance between the runners each holding a slaughtered poultry body is controllably variable.

A preferred development of the invention is characterised by conveying one of the poultry bodies at a time in a variably controllable manner by moving a pair of runners in pairs, wherein the runner pair comprises two of the adjacent runners in each case.

According to a further preferred embodiment of the invention, the respective runner positions are determined using position tracking means.

A further expedient embodiment of the invention is characterised by controlling the linear drive by a control device in such a manner that the distance in each case between the runners of one of the runner pairs corresponds at least substantially to a predetermined runner pair spacing.

According to a further preferred embodiment, the position and/or the speed of at least one of the runners of one of the runner pairs in each case is controlled based on a target position value and/or a target speed value.

A further expedient embodiment of the invention is characterised in that the position and/or the speed of the respective other runner of one of the runner pairs in each case is tracked by the control device while maintaining the respective runner pair spacing.

A preferred development of the invention is characterised by driving the rotary device at at least substantially constant circulation speed by a drive unit.

According to a further preferred embodiment of the invention, the angular position of the rotary device and the actual circulation speed is detected and the respective current positions of at least one of the suspension mounts are determined using sensor means.

A further expedient embodiment of the invention is characterised by controlling the position and/or the speed of the runners of a runner pair by the control device based on the detected actual circulation speed and the determined current position of the at least one suspension mount, in such a manner that in each case one of the holding elements of the runners for single-leg transfer and the respective suspension mount of the rotary device come together simultaneously in the transfer region.

According to a further preferred embodiment of the invention, the poultry bodies are transferred from the rotary device to the linear motor conveying device and from the linear motor conveying device to the second rotary device by a second rotary device.

The advantages and merits associated with the previously mentioned method according to the invention have already been described in detail above in connection with the arrangement according to the invention, with the result that reference is made here to the advantages mentioned there to avoid repetitions. They also apply by analogy to the method according to the invention.

Furthermore, the object is achieved by a corresponding method having the features referred to hereinbefore, in that the method comprises the steps of conveying slaughtered poultry by a linear motor conveying device, comprising a linear drive, along a circulating conveying path formed by a guide rail by controlled movement of a plurality of runners arranged along the guide rail, each runner being separately controllable and movable by the linear drive, one poultry leg in each case being held by holding elements, one each of which is arranged on each of the runners; controlling the linear drive by a control device such that one of the poultry bodies at a time is conveyed in a variably controllable manner by moving a pair of runners in pairs, the runner pair comprising two of the adjacent runners in each case. By two each of the separately controllable runners which are adjacent on the conveying rail, a runner pair is thus advantageously formed by which one of the slaughtered poultry bodies is conveyed at a time. Thus, there is control-side coupling of respective adjacent runners such that the movement of the runners is dependent on or bound to each other. This coupling of two of the runners at a time ensures that the slaughtered poultry bodies are conveyed reliably. Both legs of the slaughtered poultry body are securely held by one runner each with one of the holding elements. The enforced-coupled movement of the two runners forms a kind of rigid double suspension mount for the slaughtered poultry body to be conveyed. However, the spacing of the holding elements of such a double suspension mount is configured to be variably controllable, such that the spacing can be varied to a certain extent for different purposes.

A preferred development of the invention is characterised by determining the respective runner position using position tracking means.

According to a further preferred embodiment of the invention, the linear drive is controlled by the control device in such a manner that the distance in case between the holding elements of the runners of a runner pair corresponds at least substantially to a predetermined runner pair spacing.

A further expedient embodiment of the invention is characterised by controlling the position and/or the speed of at least one of the runners of one of the runner pairs in each case based on a target position value and/or a target speed value.

According to a further preferred embodiment, the position and/or the speed of the respective other runner of one of the runner pairs in each case is tracked by the control device while maintaining the respective runner pair spacing.

The advantages and merits associated with the previously mentioned method according to the invention have already been described in detail above in connection with the apparatus according to the invention, with the result that reference is made here to the advantages mentioned there to avoid repetitions. They also apply by analogy to the method according to the invention.

BRIEF DESCRIPTION OF THE DRAWINGS

Further preferred and/or expedient features and embodiments of the invention emerge from the description. Especially preferred embodiments are explained in greater detail with reference to the attached drawing.

The drawing shows.

DETAILED DESCRIPTION OF THE PREFERRED EMBODIMENT

Figure 1:
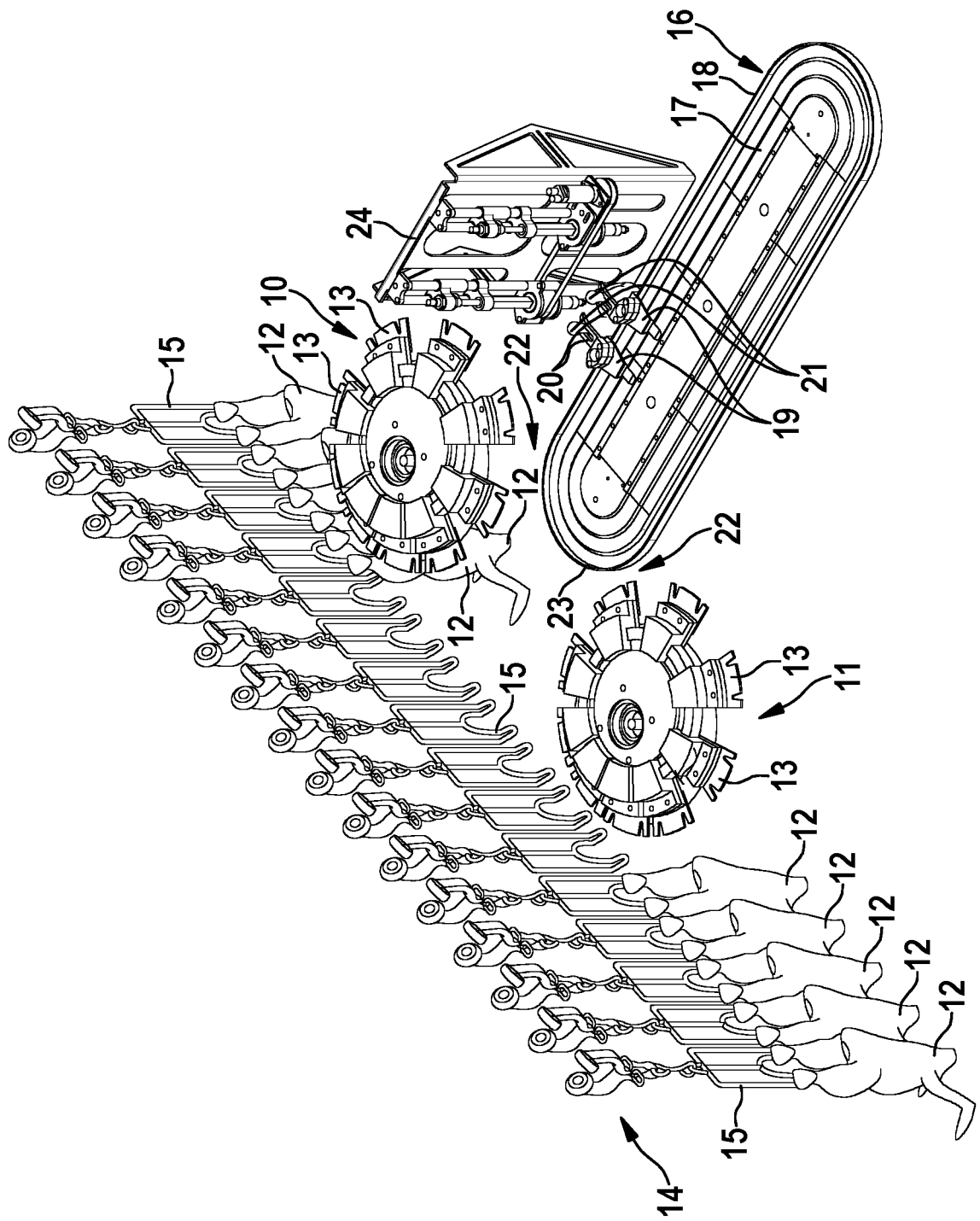
FIG. 1 is a perspective overall view of the arrangement according to the invention.
Figure 2:
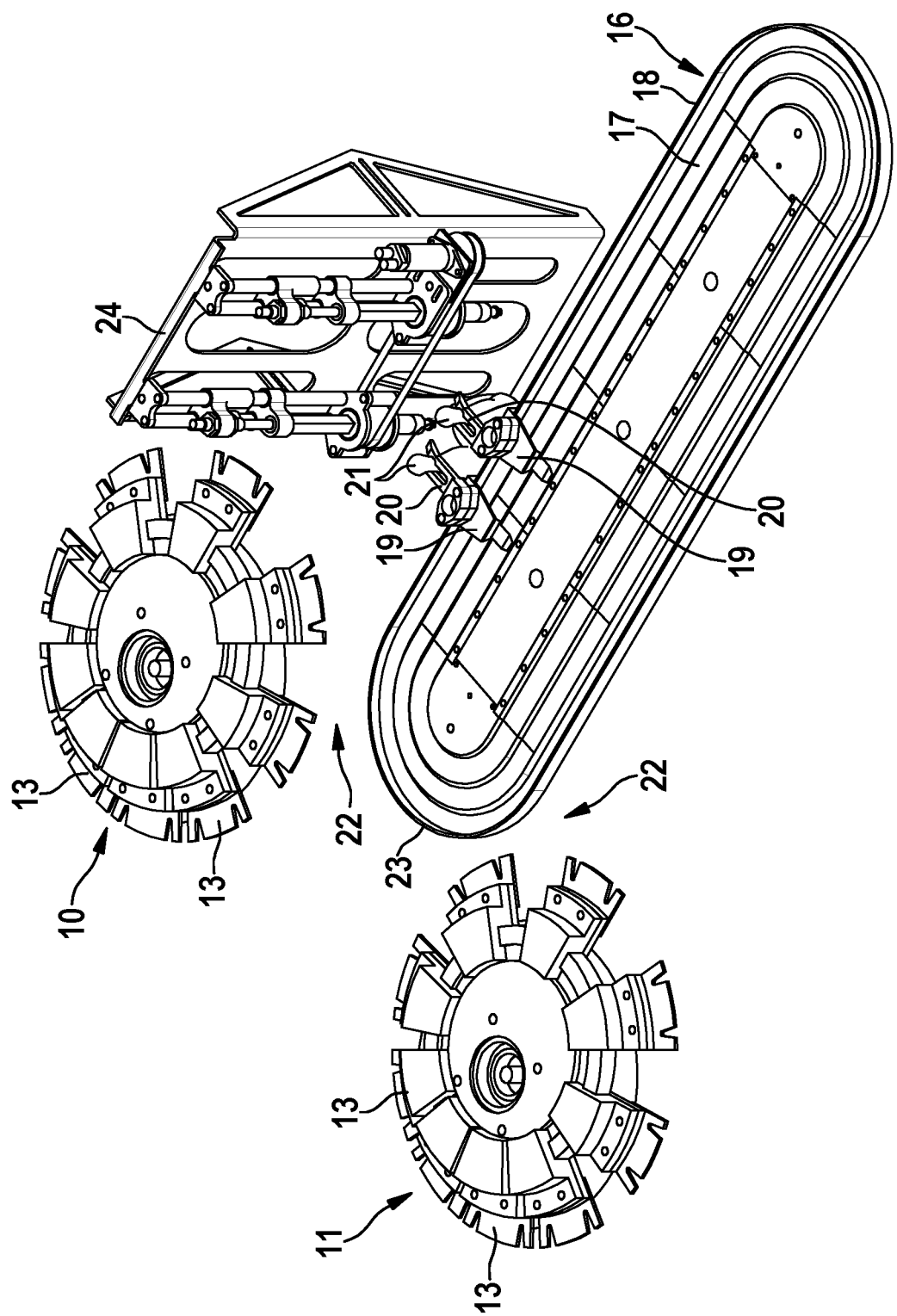
FIG. 2 is a perspective detailed view of the arrangement according to the invention.

FIG. 1 shows a perspective overall view of the arrangement according to the invention. The apparatus according to the invention, which is also shown in FIG. 1, is part of this arrangement. FIG. 2 shows a perspective detailed view of the arrangement according to the invention and the apparatus according to the invention. To avoid repetition, the arrangement according to the invention and the apparatus according to the invention will be explained in detail below, each in context with the associated method according to the invention.

FIGS. 1 and 2 show the arrangement according to the invention for transferring slaughtered poultry by way of example. The arrangement comprises at least one rotary device 10, 11 for conveying slaughtered poultry in a suspended state along a curved conveying path. The curved conveying path is defined by the structure of the rotary device. The curved conveying path can be circular for example. In this case, the at least one rotary device 10, 11 is wheel-shaped and rotates about an axis of rotation running through the centre of the wheel. Alternatively, it is possible for the axis of rotation to be arranged eccentrically with respect to the wheel centre. The at least one rotary device 10, 11, as shown in the drawing, is preferably wheel-shaped with an eccentrically arranged axis of rotation and comprises an adjustment mechanism by which the distance between the suspension mounts 13 increases during circulation towards the linear motor conveying device 16, while the distance between the suspension mounts 13 decreases correspondingly during circulation towards the main conveying line 14. The extended distance between the suspension mounts 13 in the transfer region 22 has an advantageous effect on the time window available for transferring the poultry bodies 12, such that perfect transfer is always ensured.

The at least one rotary device 10, 11 has a plurality of suspension mounts 13, each designed to hold a poultry body 12 by both legs.

Preferably, but not necessarily, the arrangement comprises a main conveying line 14, by which the poultry bodies 12, suspended in double shackles 15, are conveyed. The main conveying line 14 and the at least one rotary device 10, 11 operate more preferably synchronously, i.e. the conveying speeds are coordinated with each other in such a manner that transfer of the poultry bodies 12 from the main conveying line to the at least one rotary device 10, 11 and vice versa is facilitated.

As shown in the drawing, preferably two of the rotary devices, namely rotary device 10 and the second rotary device 11, are provided. In the interests of clearer presentability, only one of the rotary devices 10, 11 will initially be described below. However, all the remarks regarding it apply to each of the rotary devices 10, 11 in the same manner.

The arrangement according to the invention further comprises a linear motor conveying device 16 which has a linear drive. The linear motor conveying device 16 forms a circulating conveying path 17 with a plurality of runners 19 arranged along the guide rail 18, each runner being separately controllable and movable by the linear drive, only two of which runners in each case are shown in the drawing for reasons of clarity. Such a linear motor conveying device 16, for example, is the linear transport system XTS by the Beckhoff company. A plurality of individually controllable electromagnets are arranged in the guide rail 18 of such a linear motor conveying device 16, while the runners 19 are displaceably mounted along the guide rail 18 by ball or roller bearings. The linear drive is implemented by the controllable electromagnets of the guide rail 18 and magnets integrated in the runners 19, such that each of the runners 19 is configured to be individually and separately controllable and thus separately movable.

One holding element 20 in each case, which is designed and configured to accommodate one poultry leg 21 at a time, is arranged on each of the runners 19.

The rotary device 10 and the linear motor conveying device 16 are arranged in such a manner that the curved conveying path, in a transfer region 22, at least partially overlaps with a curved portion 23 of the circulating conveying path 17. This facilitates the transfer of the slaughtered poultry or the poultry bodies 12 between the conveying lines, i.e. between the at least one rotary device 10, 11 and the linear motor conveying device 16. As can be seen from the drawing, on the one hand the open sides in each case of the suspension mounts 13 of the at least one rotary device 10, 11 and the holding elements 20 for accommodating one of the poultry legs 21 at a time in the transfer region 22 are each directed towards each other, such that the respective poultry leg 21 can be transferred from the suspension mount 13 to the respective holding element 20 and vice versa. Partial overlapping of the curved conveying path and the curved portion 23 of the circulating conveying path 17 is understood to mean that the respective track sections are arranged in such a manner that they overlap at at least one point or have a minimum distance from each other which permits reliable single-leg transfer.

The linear motor conveying device 16 has a control device, not shown in the drawing, which is designed for conveying one of the poultry bodies 12 at a time in a variably controllable manner by moving one of the runner pairs in pairs. A runner pair comprises two adjacent runners 19 in each case, i.e. two runners 19 in each case are arranged side by side on the guide rail 18. The control device is thus designed to move the two runners 19 of a runner pair quasi-synchronously. In this way, the runners 19 thus moved together form a kind of "virtual" poultry body receptacle, whose holding elements 20 for the two poultry legs 21 of each of the poultry bodies 12 have a constant or substantially constant spacing. However, the spacing of the runners 19 of a runner pair is optionally configured to be variable by the control device, as will be explained in detail below.

A processing station 24 is only indicated schematically in FIGS. 1 and 2. The processing station 24 is designed and configured for stationary processing of the poultry bodies 12. The processing station 24, for example, is designed for gutting or for creating access to the abdominal cavity of the poultry body 12 via the cloacal opening. The processing station 24 can basically be designed to carry out any common processing operation which is required in the processing of slaughtered poultry. For this purpose, a plurality of the processing stations 24 with different functions can optionally be arranged along the circulating conveying path 17.

The control device is further configured to bring the poultry bodies 12 into various processing positions as required by moving the runners 19, which form a pair of runners, in pairs, thus facilitating optimum processing by the processing station 24.

The runners 19 preferably each comprise position tracking means, not shown in the drawing, which are configured to determine the respective runner position. It is also possible for the control device of the linear motor conveying device 16 to comprise means for position tracking of each of the individual runners 19. In this way, the position of each runner 19 is configured to be trackable. The position tracking can be carried out, for example, by teaching in the runners 19 at a predefined zero position. If the position of the runner 19 is subsequently changed by the control device, the changed current position is continuously stored in the control device.

The runners 19 are alternatively provided with an identifier which is read by the control device and used to determine their position. More preferably, the position tracking means are an integrated component of the control device of the linear motor conveying device 16. This has the advantage that the respectively desired positions of the runners 19 or the desired movement profile is/are predefinable by the control device and the control device takes over exact positioning of the runners 19.

Advantageously, the control device is further configured to control the linear drive in such a manner that the distance in each case between the runners 19 of one of the runner pairs corresponds at least substantially to a predetermined runner pair spacing. In this way, the distance between the said runners 19 is held substantially constant in order to reliably convey the poultry bodies 12 suspended from the poultry legs 21 in a variably controllable manner.

The control device is additionally configured to control the position and/or the speed of at least one of the runners 19 of one of the runner pairs in each case based on a target position value and/or a target speed value. On the one hand, such target position values and/or target speed values enable controlled transfer of the poultry bodies 12 between one of the rotary devices 10, 11 and the linear motor conveying device 16 and, on the other hand, a temporary stop for stationary processing of the poultry bodies by the processing station 24.

The control device is preferably further configured to track the position and/or the speed of the respective other runner 19 of one of the runner pairs in each case while maintaining the respective runner pair spacing. In other words, the control device is designed to specify the respective position of one of the runners 19 based on the target position value and/or the target speed value. The respective other runner 19 of the runner pair is tracked by the control device while maintaining the predetermined runner pair spacing, thus it follows the first of the runners 19 at a predefined distance. Consequently, the control device is configured to set the position and/or speed of the first runner of the runner pair as the master, while the respective other of the runners 19 in slave operation thereto is tracked at a constant or substantially constant distance behind the first of the runners 19.

The rotary device 10 preferably comprises a drive unit, not shown in the drawing, by which it is driven at at least substantially constant circulation speed. The circulation speed of the rotary device is preferably matched to the conveying speed of the main conveying line 14. More preferably, the drive of the main conveying line is mechanically coupled to that of the rotary device 10, 11 such that they are enforced-synchronised. According to an alternative embodiment, the rotary devices 10, 11 and the main conveying line are each equipped with their own drive units, each with drive speeds matched to each other.

The rotary device 10 and/or the rotary device 11 is/are configured to detect the angular position of the respective rotary device 10, 11 and comprise sensor means configured for this purpose. The sensor means are further configured to detect the actual circulation speed and to determine the respective current position of at least one of the suspension mounts 13. In addition, the control device is designed to control the position and/or the speed of the runners of a runner pair based on the detected actual circulation speed and the determined current position of the at least one suspension mount in such a manner that in each case one of the runners and the respective suspension mount of the rotary device come together simultaneously in the transfer region 22 for single leg transfer.

In other words, the control device is designed to synchronise the runners 19 in the transfer region 22 with the circulation of the respective rotary device 10, 11, while in the other conveying sections of the circulating conveying path 17 of the linear motor conveying device 16, the movement of the runners 19 is independent of the circulation speed of the rotary devices 10, 11.

Figure 9:
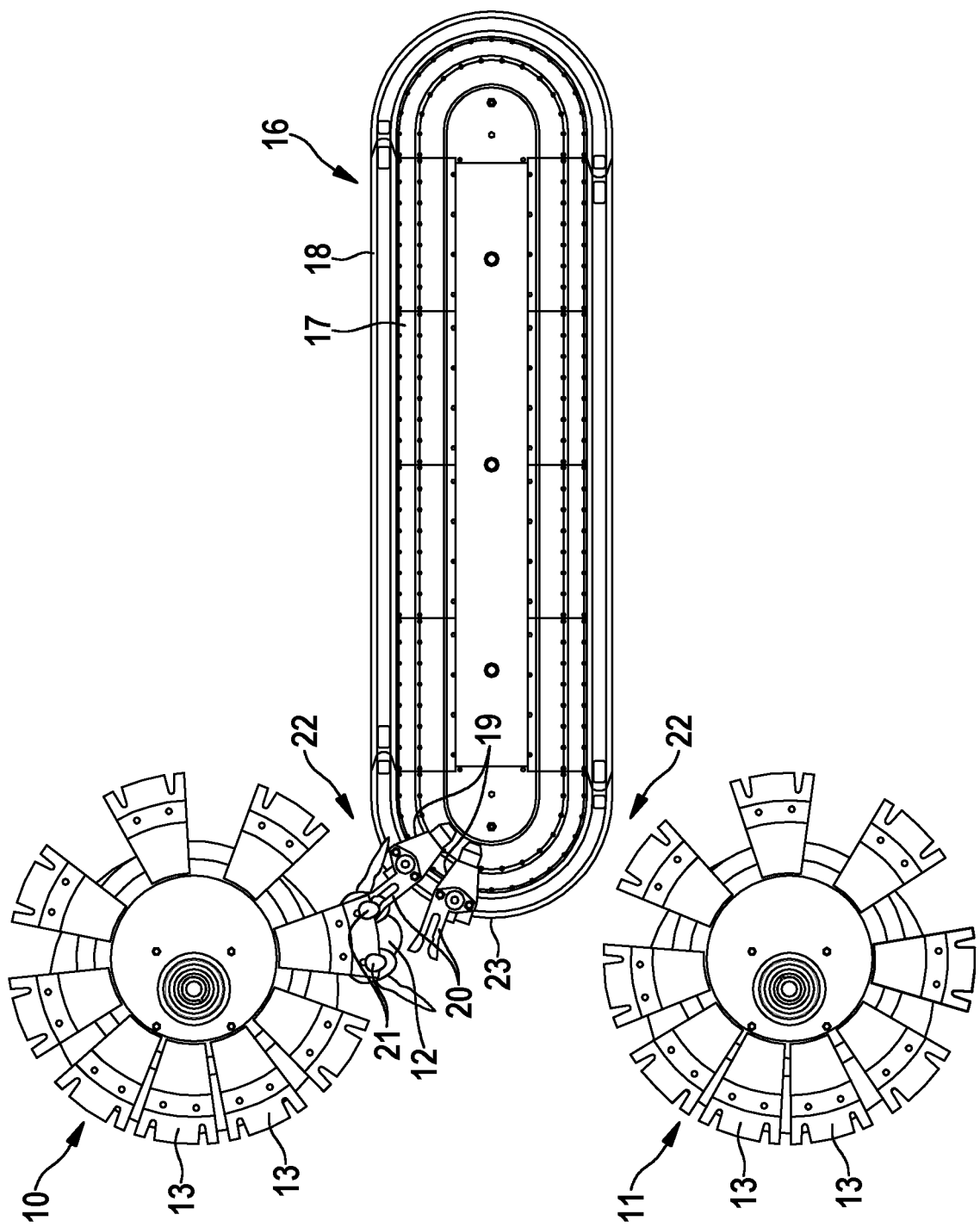
FIGS. 9 and 10 are top views of a selection of the transfer stages shown in FIGS. 3 to 8.
Figure 10:
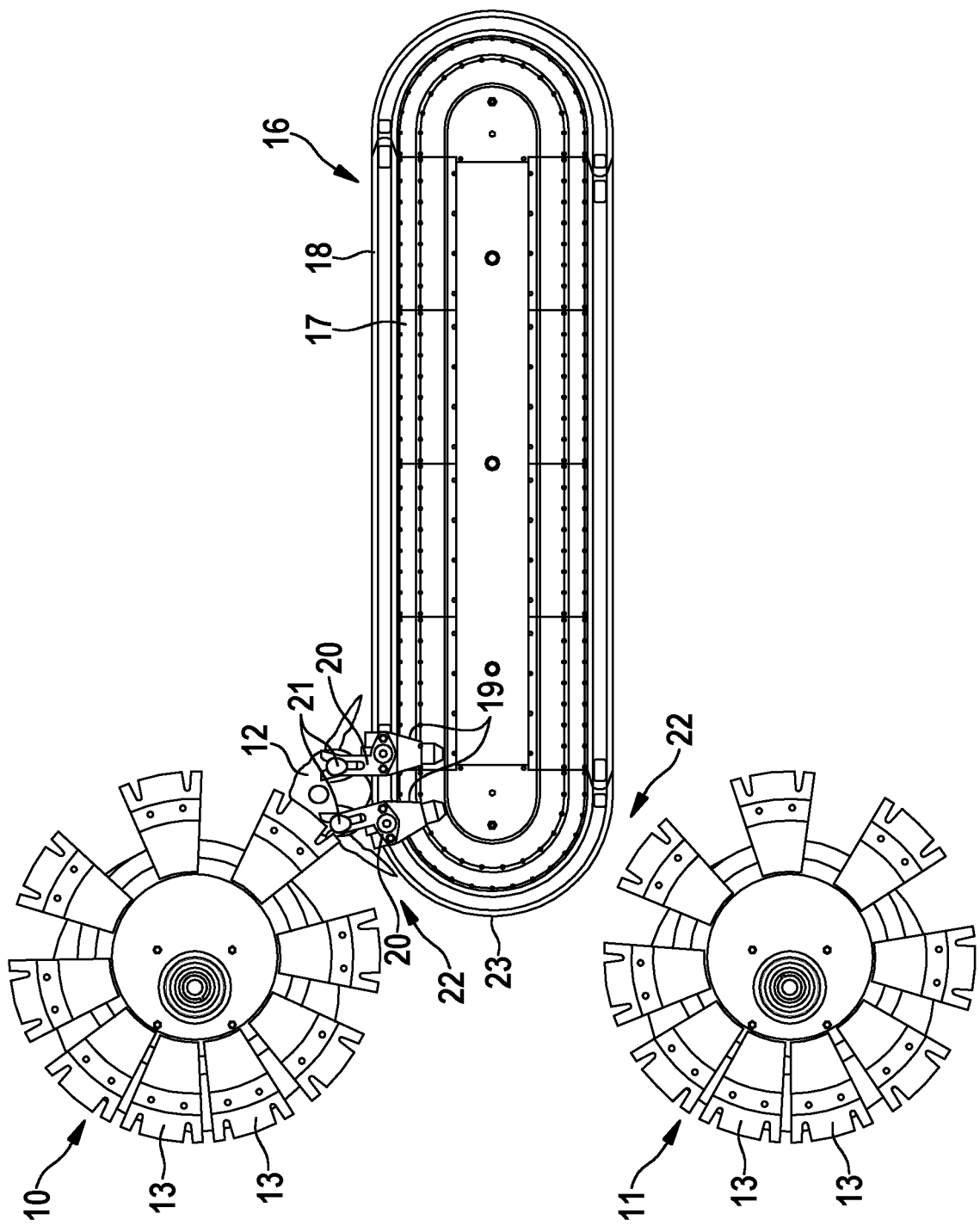
Figure 11:
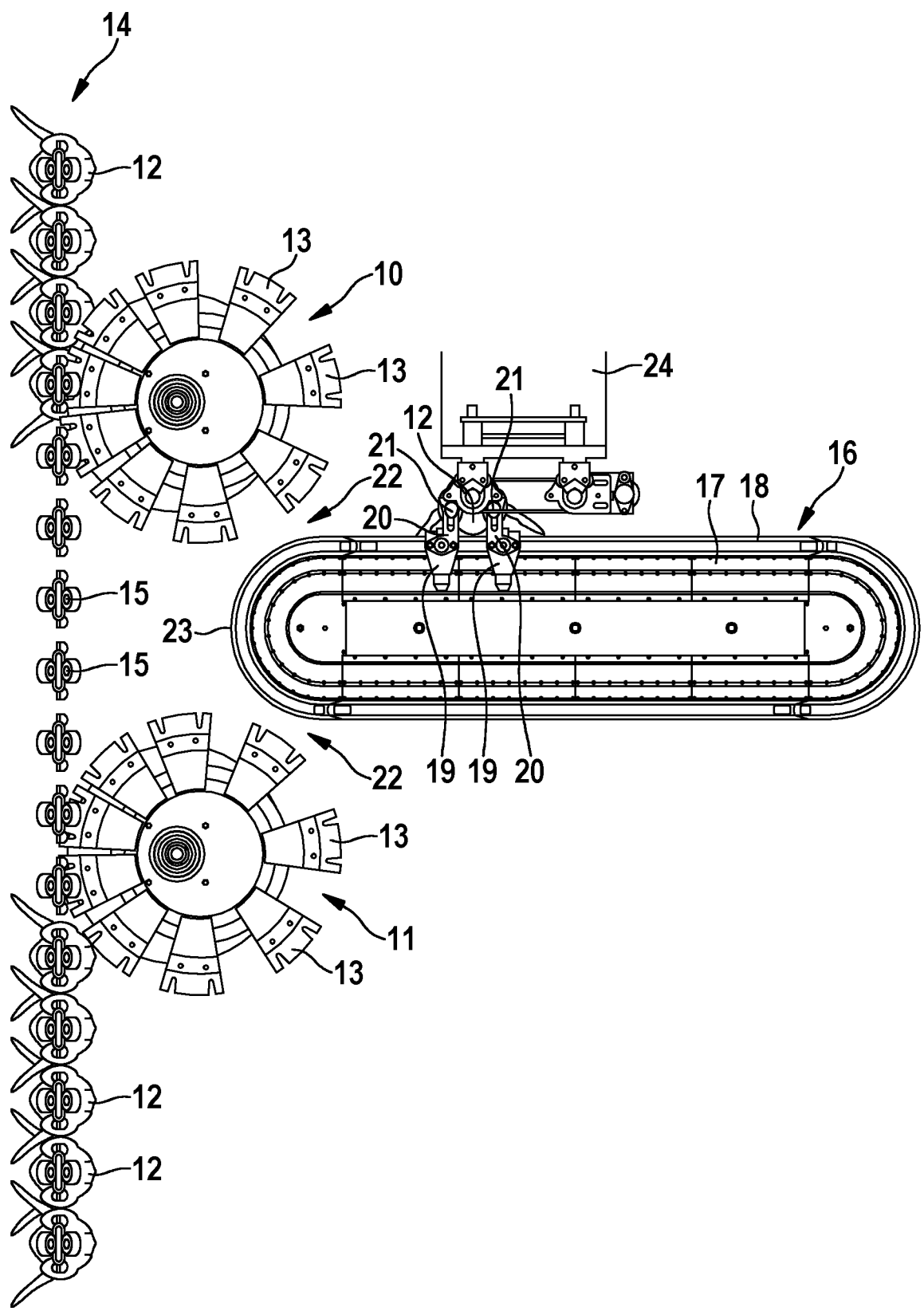
FIG. 11 is a top view of the view shown in FIG. 1.

This will be explained in greater detail below based on FIGS. 3 to 8, which each show perspective views at different stages of transferring a poultry body, and the corresponding top views shown in FIGS. 9 and 10. The process is described by way of example during the transfer of a poultry body 12 from the rotary device 10 to the linear motor conveying device 16, but it also applies analogously to the transfer of a poultry body 12 from the linear motor conveying device 16 to the second rotary device 11.

Figure 3:
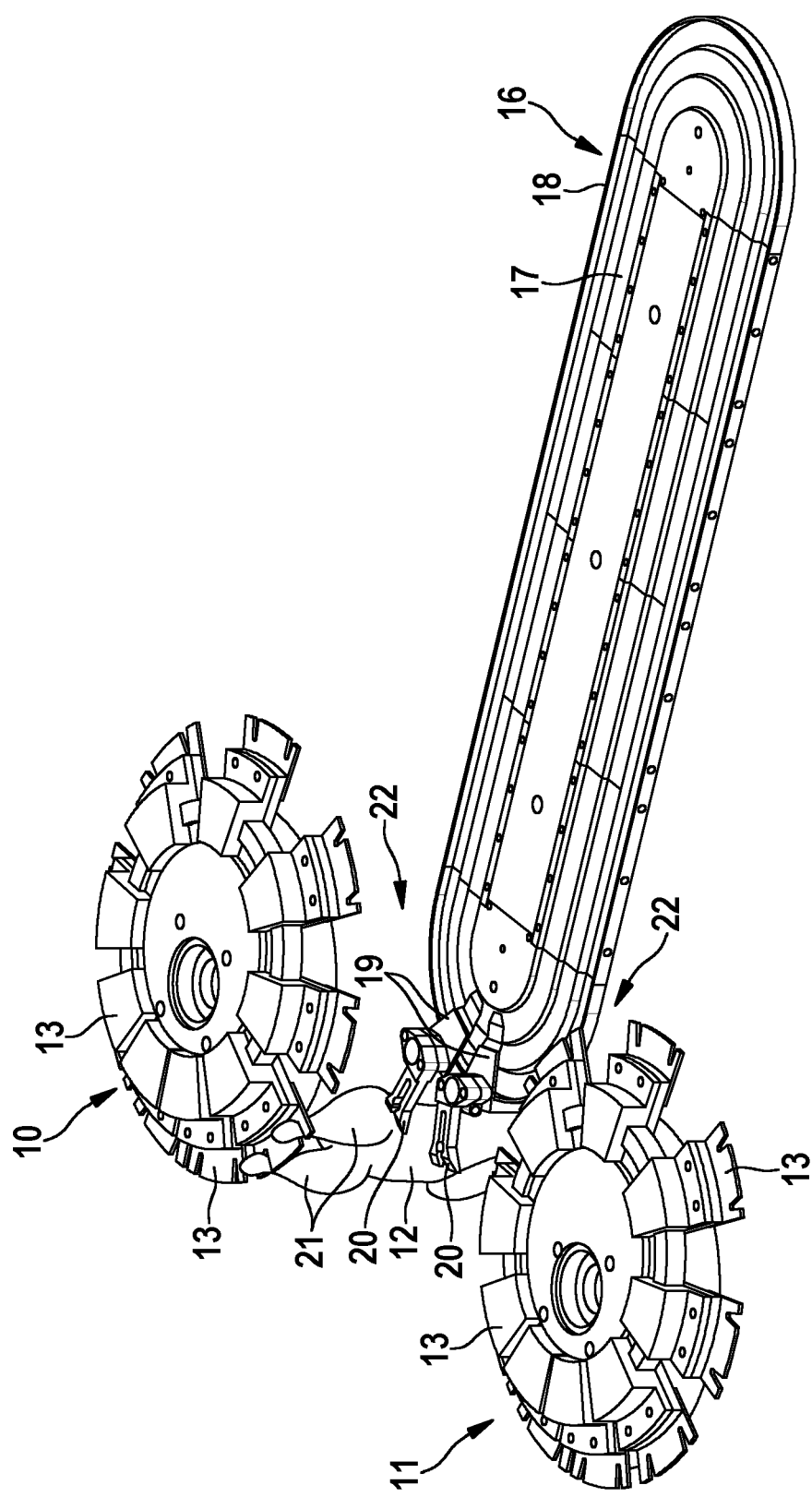
FIGS. 3-8 are in each case perspective views at different stages of transferring a poultry body.

FIG. 3 shows the positions of the runners 19 of a runner pair before transfer of the poultry body 12 from the rotary device 10 to the linear motor conveying device 16 commences. Via the sensor means, not shown, the control device has access to information regarding which current (angular) position the first rotary device 10 is in. The control device now controls the runners 19, moving in a clockwise direction, of the linear motor conveying device 16 in such a manner that, at the latest when they enter the transfer region 22, they have a conveying speed which corresponds to the track speed of the poultry leg 21 to be transferred. The control device is further configured to establish in advance the expected time at which the runner 19 meets the first of the poultry legs 21 and to determine the acceleration profile required for this purpose, with which the leading runner 19 of the runner pair is to be accelerated.

Figure 4:
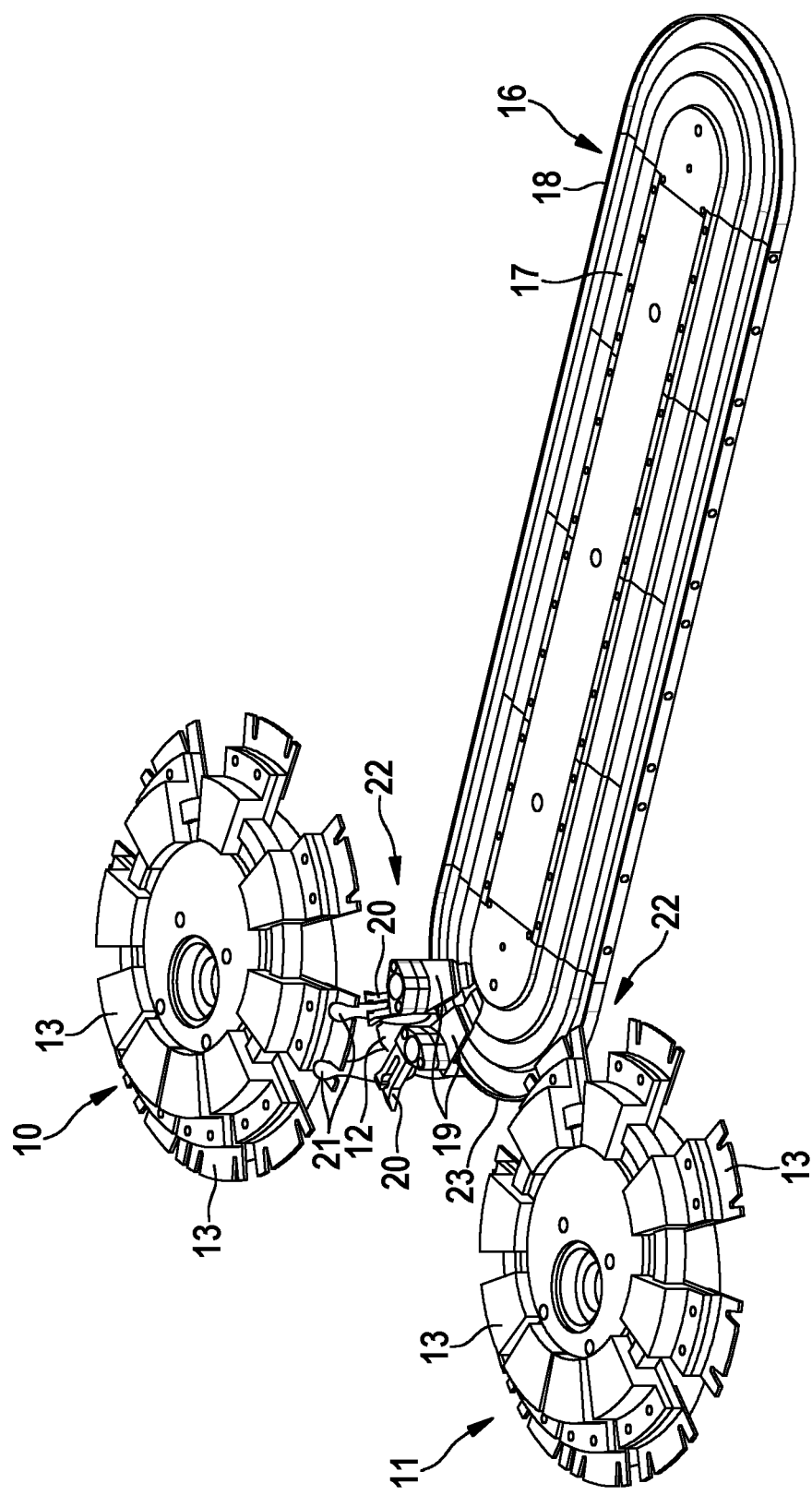
Figure 5:
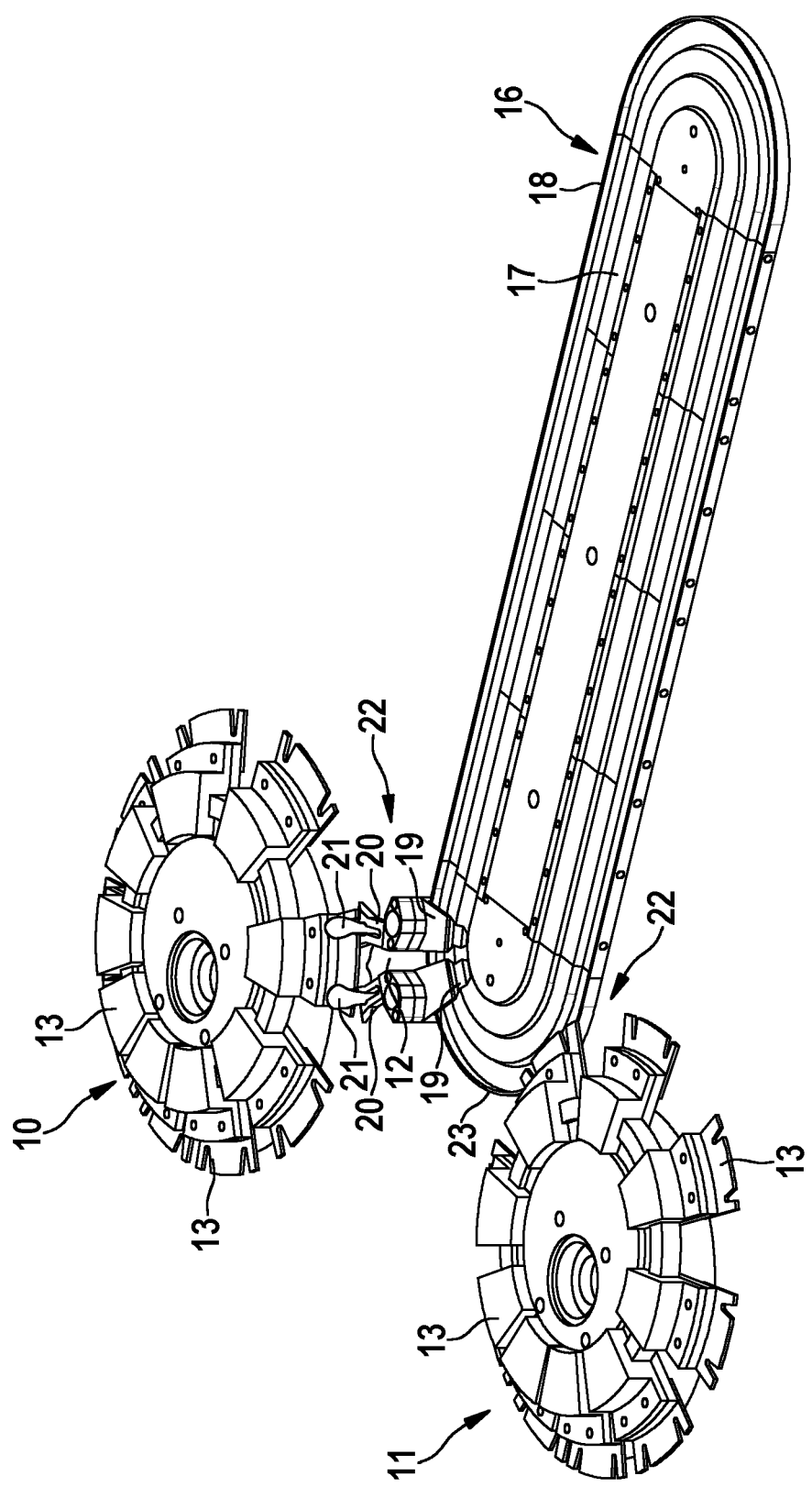

As a result, the leading runner 19 of the runner pair, as shown in FIGS. 4 and 5, exactly meets the holding element 20 of the first of the poultry legs 21 in the transfer region 22 such that the first of the poultry legs 21 is transferred out of the suspension mount 13 of the rotary device 11 into the holding element 20 of the leading runner 19.

Figure 6:
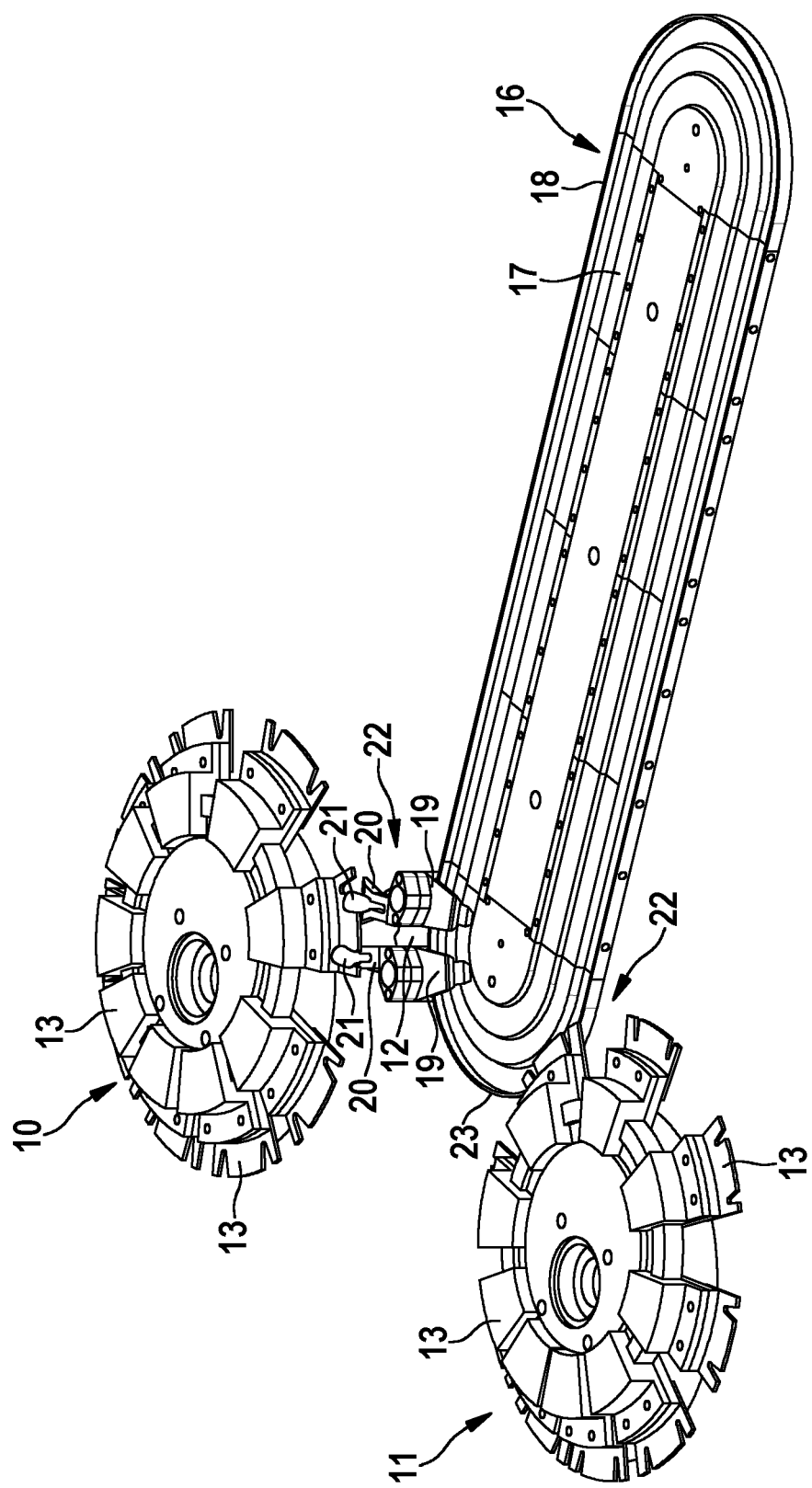
Figure 7:
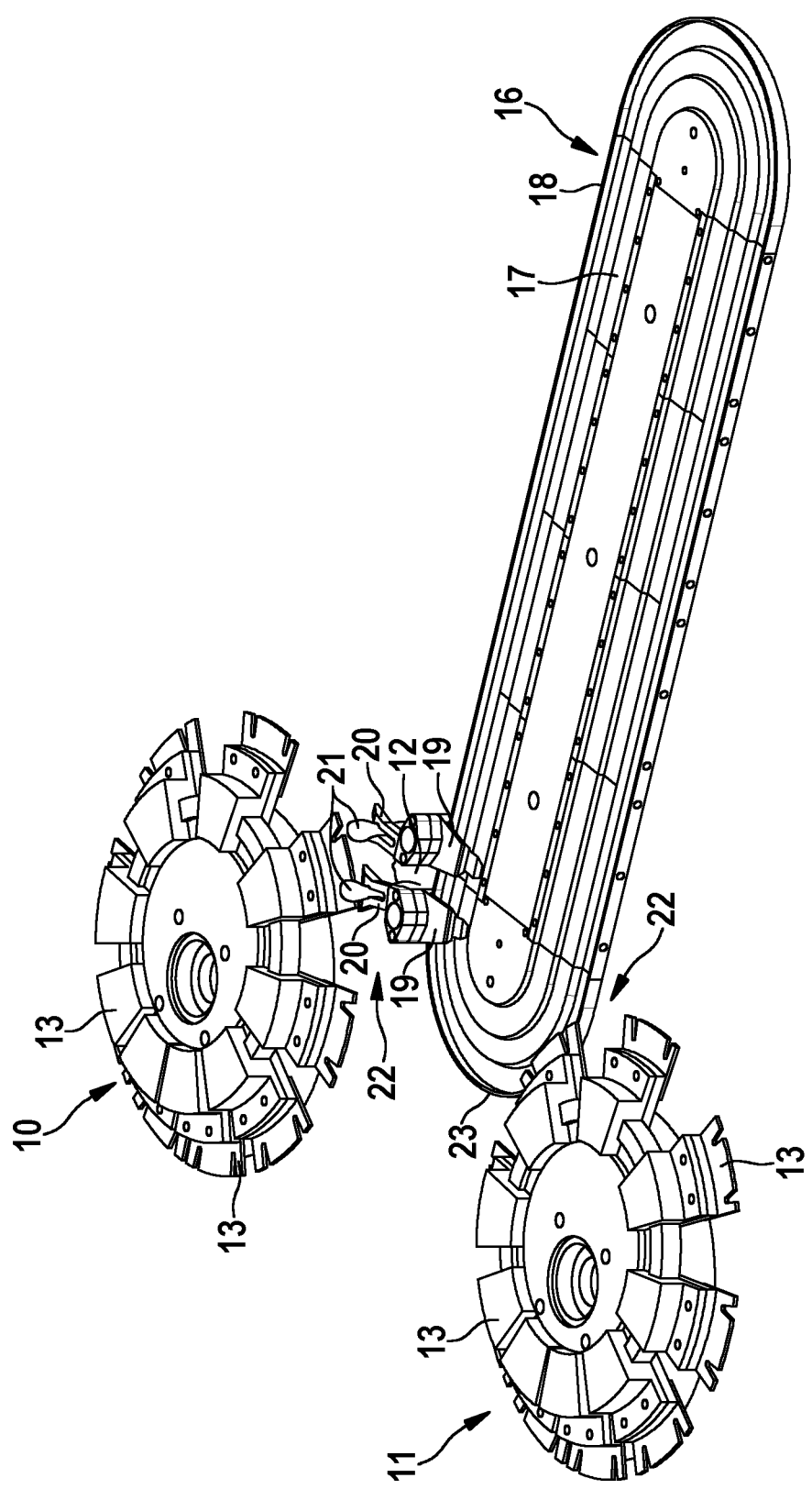
Figure 8:
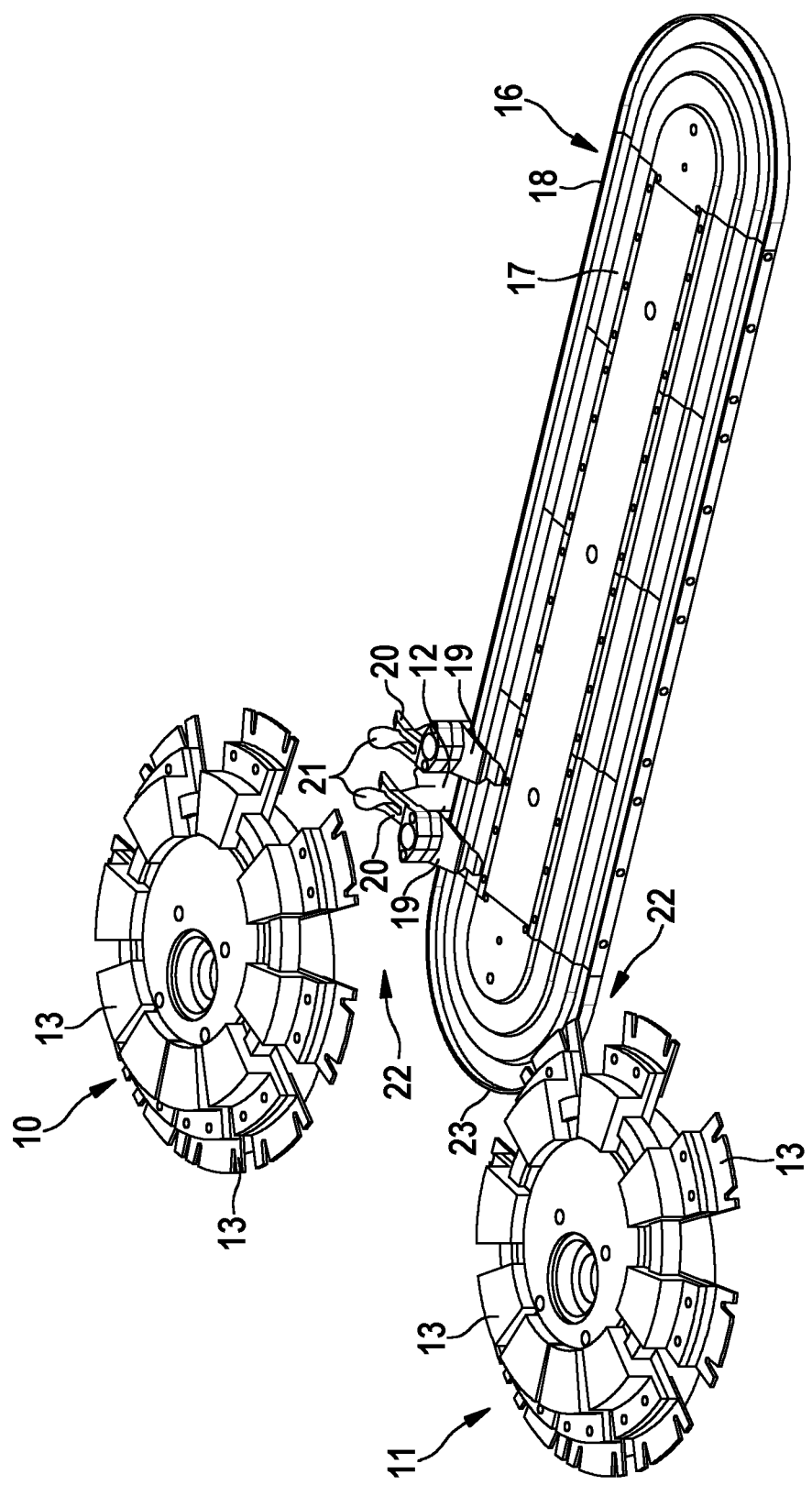

FIG. 6 shows how the leading runner 19 has already taken the first of the poultry legs 21, while the second of the poultry legs 21 is now transferred from the suspension mount 13 of the rotary device 11 to the holding element 20 of the trailing runner 19. FIGS. 6 and 7 show how the poultry legs 21 finally leave the suspension mounts 13 and now, suspended in their holding elements 20 by the runners 19, are conveyed further by the linear motor conveying device 16.

The enforced synchronisation previously described between the runners 19 and the rotary device 10 ends at the point of leaving the transfer region 22. That is to say, the control device is configured to convey the runners 19 along the circulating conveying path 17 at any desired speeds as required, independently of the circulation speed of the rotary device 10, 11. Thus, for example, the poultry bodies 12 can be stopped at the processing station 24 for processing purposes for different lengths of time without this having any effect on the conveying speed of the main conveying line 14. This opens up the opportunity for high quality processing of the poultry bodies 12. Due to decoupling from a processing time window otherwise predetermined by the conveying speed of the main conveying line 14, within which the processing steps would have to be performed, the present invention has the advantage that processing is individualised and can be carried out in an optimum manner for each individual one of the poultry bodies 12. FIGS. 9 and 10 show supplementary top views of the transfer stages shown in FIGS. 4 and 7.

As shown in the drawing, the rotary device 10 is configured to transfer the poultry bodies 12 to the linear motor conveying device 16. A second rotary device 11 is designed to transfer the poultry bodies 12 from the linear motor conveying device 16 to the second rotary device 11. In other words, the rotary device 10 is designed to take the poultry bodies 12 from the main conveying line 14 and then transfer them to the linear motor conveying device 16. The second rotary device 11 is configured to take the poultry bodies 12 from the linear motor conveying device and to subsequently return them to the main conveying line 14 or to other conveying lines, not shown in the drawing.

The remarks made above regarding the arrangement according to the invention also apply analogously to the apparatus according to the invention which is a central component of the arrangement previously described. To avoid repetition, reference is therefore made to the relevant passages above with regard to the apparatus according to the invention and the apparatus according to the invention is only briefly described below in addition.

The apparatus according to the invention is designed for conveying slaughtered poultry in the form of poultry bodies 12 in a suspended state along the conveying path in a poultry processing plant. The apparatus comprises at least one of the linear motor conveying devices 16 with a linear drive. The linear motor conveying device 16 further comprises the previously described circumferential guide rail 18 and a plurality of runners 19 each arranged to be separately controllable and movable along the guide rail 18 by the linear drive. One of the holding elements 20 in each case, which is configured to accommodate one of the poultry legs 21 at a time, is arranged on each of the runners 19.

The runners 19 are moved in pairs by the control device configured to control the linear drive, and the poultry bodies 12 are thus conveyed in a variably controllable manner. In this way, two adjacent runners 19 in each case form a runner pair.

The runners 19 and/or the linear motor conveying device 16 each comprise the previously mentioned position tracking means for determining the respective runner position. The control device is designed to control the linear drive in such a manner that the distance in each case between the runners 19 of one of the runner pairs corresponds at least substantially to a predetermined runner pair spacing.

The position and/or the speed of at least one of the runners 19 of one of the runner pairs in each case are controlled based on a target position value and/or a target speed value by the control device designed for this purpose. The control device is preferably further configured to track the position and/or the speed of the respective other runner 19 of one of the runner pairs in each case while maintaining the respective runner pair spacing.

The method according to the invention for transferring slaughtered poultry between conveying lines in a poultry processing plant emerges from the remarks made above regarding the arrangement according to the invention, which is why only supplementary comments regarding some selected aspects of the method according to the invention are made below.

The method according to the invention comprises the following steps: conveying slaughtered poultry or poultry bodies 12 by at least one rotary device 10 designed for conveying the slaughtered poultry in a suspended state along a curved conveying path, the poultry bodies 12 each being held by both legs by a plurality of suspension mounts 13 of the rotary device 10; conveying the slaughtered poultry or poultry bodies 12 by a linear motor conveying device 16, comprising a linear drive, along a circulating conveying path 17 formed by a guide rail 18 by controlled movement of a plurality of runners 19 arranged along the guide rail 18, each runner being separately controllable and movable by the linear drive, one poultry leg 21 in each case being held by holding elements 20, one each of which is arranged on each of the runners 19; transferring the slaughtered poultry or poultry bodies 12 between the conveying lines by at least partial overlapping, in the transfer region 22, of the curved conveying path of the rotary device 10 with a curved portion of the circulating conveying path 17. Preferably one of the poultry bodies 12 at a time is conveyed in a variably controllable manner by moving a pair of runners in pairs. The respective runner position is preferably detected and determined by position tracking means.

As described previously, the distance between the runners 19 of one of the runner pairs is controlled by the control device in such a manner that it corresponds exactly or substantially to a predetermined runner pair spacing. The position and/or the speed of one of the runners 19 of one of the runner pairs in each case is controlled based on the target position value and/or the target speed value. The position and/or the speed of the respective other runner 19 is tracked by the control device while maintaining the respective runner pair spacing.

The rotary device 10 is preferably driven at at least substantially constant speed by a drive unit, and its angular position, the actual circulation speed and the respective current position of at least one of the suspension mounts 13 are detected using sensor means and transmitted to the control device.

Position and/or speed of the runners 19 of a runner pair is controlled by the control device based on the detected actual circulation speed and the determined current position of the at least one suspension mount 13, in such a manner that in each case one of the runners 19 for single-leg transfer and the respective suspension mount 13 of the rotary device 10 come together simultaneously in the transfer region 22. The timing required for this purpose and the specification of a movement profile of the runners 19 is described in detail in connection with the arrangement according to the invention.

On the one hand, the poultry bodies 12 are preferably transferred from the rotary device 10 to the linear motor conveying device 16, while on the other hand transfer of the poultry bodies 12 from the linear motor conveying device 16 back to the main conveying line 14 takes place by the second rotary device 11.

The present invention further comprises a method for conveying slaughtered poultry in a suspended state along a conveying path in a poultry processing plant. This method has already been explained in connection with the apparatus according to the invention such that only supplementary remarks regarding it are made below.

The method comprises conveying of the slaughtered poultry or poultry bodies by the linear motor conveying device 16, which comprises the linear drive, along the circulating conveying path 17 which is formed by the guide rail 18. The poultry bodies 12 are conveyed by controlled movement of a plurality of runners 19 each arranged to be separately controllable and movable along the guide rail 18 by the linear drive. The poultry legs 21 are held by holding elements 20 arranged on each of the runners 19.

The linear drive is controlled by the control device in such a manner that one of the poultry bodies 12 at a time is conveyed by moving a pair of runners in pairs. The runner position is determined using position tracking means and transmitted to the control device for further processing. In this way, the distance between the runners 19 of one of the runner pairs is controlled such that it corresponds at least substantially to the predetermined runner pair spacing. Preferably, the position and/or the speed of at least one of the runners 19 of one of the runner pairs in each case is/are controlled based on a target position value and/or a target speed value. More preferably, the position and/or speed of the respective other runner 19 of one of the runner pairs in each case is tracked by the control device while maintaining the respective runner pair spacing.

The invention claimed is:

1. An arrangement for transferring slaughtered poultry between conveying lines in a poultry processing plant, comprising:
   at least one rotary device for conveying slaughtered poultry in a suspended state along a curved conveying path with a plurality of suspension mounts, each designed to hold a poultry body by both legs;
   a linear motor conveying device with a guide rail comprising a linear drive, forming a circulating conveying path with a plurality of runners, each of the plurality of runners arranged to be separately controllable and movable along the guide rail by the linear drive, and holding elements, designed to accommodate one poultry leg at a time, wherein one of the holding elements is arranged on each of the runners, and wherein
   the rotary device and the linear motor conveying device are arranged in such a manner that the curved conveying path at least partially overlaps with a curved portion of the circulating conveying path in a transfer region for transferring the slaughtered poultry between the conveying lines.

2. The arrangement according to claim 1, wherein the linear motor conveying device comprises a control device which is designed to convey one of the poultry bodies at a time in a variably controllable manner by moving a pair of runners in pairs, wherein the runner pair comprises two of the adjacent runners.

3. The arrangement according to claim 2, wherein the runners each comprise position tracking means to determine a runner position.

4. The arrangement according to claim 3, wherein the control device is configured to control the linear drive in such a manner that a distance between holding elements of the runners of one of the runner pairs corresponds at least substantially to a predetermined runner pair spacing.

5. The arrangement according to claim 3, wherein the control device is configured to control the position and/or a speed of at least one of the runners of one of the runner pairs based on a target position value and/or a target speed value.

6. The arrangement according to claim 5, wherein the control device is further configured to track the position and/or the speed of the respective other runner of one of the runner pairs while maintaining a respective runner pair spacing.

7. The arrangement according to claim 2, wherein the rotary device comprises a drive unit and is driven at least substantially at constant circulation speed.

8. The arrangement according to claim 7, wherein the rotary device comprises sensor means configured to detect an angular position, to detect an actual circulation speed and to determine a respective current position of at least one of the suspension mounts.

9. The arrangement according to claim 8, wherein the control device is designed to control a position and/or a speed of the runners of a runner pair based on the detected actual circulation speed and the determined current position of the at least one suspension mount in such a manner that one of the holding elements of the runners for single-leg transfer and the respective suspension mount of the rotary device come together simultaneously in the transfer region.

10. The arrangement according to claim 1, wherein the rotary device is configured to transfer the poultry bodies to the linear motor conveying device and the arrangement further comprises a second rotary device which is designed to transfer the poultry bodies from the linear motor conveying device to the second rotary device.

11. An apparatus for conveying slaughtered poultry in a suspended state along a conveying path in a poultry processing plant, comprising:
    at least one linear motor conveying device with a circumferential guide rail comprising a linear drive and with a plurality of runners, each of the plurality of runners arranged to be separately controllable and movable along the guide rail by the linear drive;
    holding elements, designed to accommodate one poultry leg at a time, wherein one of the holding elements is arranged on each of the runners; and
    a control device designed to control the linear drive, which control device is designed to convey one of the poultry bodies at a time in a variably controllable manner by moving a pair of runners in pairs, wherein the runner pair comprises two of the adjacent runners.

12. The apparatus according to claim 11, wherein the runners each comprise position tracking means to determine a runner position.

13. The apparatus according to claim 12, wherein the control device is configured to control the linear drive in such a manner that a distance between the holding elements of the runners of one of the runner pairs corresponds at least substantially to a predetermined runner pair spacing.

14. The apparatus according to claim 13, wherein the control device is configured to control the position and/or a speed of at least one of the runners of one of the runner pairs based on a target position value and/or a target speed value.

15. The apparatus according to claim 14, wherein the control device is further configured to track the position and/or a speed of the respective other runner of one of the runner pairs while maintaining the respective runner pair spacing.

16. A method for transferring slaughtered poultry between conveying lines in a poultry processing plant, comprising:
    conveying slaughtered poultry by at least one rotary device designed for conveying the slaughtered poultry in a suspended state along a curved conveying path, wherein the poultry bodies are each held by both legs by a plurality of suspension mounts of the rotary device;
    conveying the slaughtered poultry by a linear motor conveying device, which comprises a linear drive, along a circulating conveying path formed by a guide rail by controlled movement of a plurality of runners arranged along the guide rail, each runner being separately controllable and movable by the linear drive, wherein one poultry leg is held by holding elements, one each of which is arranged on each of the runners; and
    transferring of the slaughtered poultry between the conveying lines by at least partial overlapping of the curved conveying path of the rotary conveying device with a curved portion of the circulating conveying path in a transfer region.

17. The method according to claim 16, further comprising conveying one of the poultry bodies at a time in a variably controllable manner by moving a pair of runners in pairs, wherein the runner pair comprises two of the adjacent runners.

18. The method according to claim 17, further comprising controlling the linear drive by a control device in such a manner that a distance between the holding elements of the runners of one of the runner pairs corresponds at least substantially to a predetermined runner pair spacing.

19. The method according to claim 18 further comprising controlling a position and/or the speed of at least one of the runners of one of the runner pairs based on a target position value and/or a target speed value.

20. The method according to claim 19, wherein the control device is further configured to track a position and/or a speed of the respective other runner of one of the runner pairs while maintaining the respective runner pair spacing.

21. The method according to claim 17, further comprising using sensor means to detect an angular position of the rotary device, detect an actual circulation speed and determine a respective current position of at least one of the suspension mounts.

22. The method according to claim 21, further comprising controlling a position and/or a speed of the runners of a runner pair by a control device based on the detected actual circulation speed and the determined current position of the at least one suspension mount, in such a manner that one of the holding elements of the runners for single-leg transfer and the respective suspension mount of the rotary device come together simultaneously in the transfer region.

23. The method according to claim 16, further comprising determining a respective runner position using position tracking means.

24. The method according to claim 16, further comprising driving the rotary device at at least substantially constant circulation speed by a drive unit.

25. The method according to claim 16, further comprising transferring the poultry bodies from the rotary device to the linear motor conveying device and transferring the poultry bodies from the linear motor conveying device to a second rotary device.

26. A method for conveying slaughtered poultry in a suspended state along a conveying path in a poultry processing plant, comprising:
    conveying the slaughtered poultry by a linear motor conveying device, which comprises a linear drive, along a circulating conveying path formed by a guide rail by controlled movement of a plurality of runners arranged along the guide rail, each runner being separately controllable and movable by the linear drive, wherein one poultry leg is held by holding elements, one each of which is arranged on each of the runners; and
    controlling the linear drive by a control device in such a manner that one of the poultry bodies at a time is conveyed in a variably controllable manner by moving a pair of runners in pairs, wherein the runner pair comprises two of the adjacent runners.

27. The method according to claim 26, further comprising determining a respective runner position using position tracking means.

28. The method according to claim 26, further comprising controlling the linear drive by the control device in such a manner that a distance between the runners of one of the runner pairs corresponds at least substantially to a predetermined runner pair spacing.

29. The method according to claim 28, further comprising controlling a position and/or a speed of at least one of the runners of one of the runner pairs based on a target position value and/or a target speed value.

30. The method according to claim 29, further comprising tracking a position and/or a speed of the respective other runner of one of the runner pairs by the control device while maintaining the respective runner pair spacing.

\* \* \* \* \*